United States Patent
Saladino et al.

(10) Patent No.: US 11,913,238 B2
(45) Date of Patent: Feb. 27, 2024

(54) POLYMER FOAM SHEET AND BARRIER LAYER COMPOSITE

(71) Applicant: Palziv Ein Hanaziv Agricultural Cooperative Society Ltd., Ein Hanatziv (IL)

(72) Inventors: Sam Saladino, Toronto (CA); Zeev Tzur, Ein Hanatziv (IL); Baruch Zur, Ein Hanatziv (IL)

(73) Assignee: PALZIV EIN HANAZIV AGRICULTURAL COOPERATIVE SOCIETY LTD., Ein Hanatziv (IL)

( * ) Notice: Subject to any disclaimer, the term of this patent is extended or adjusted under 35 U.S.C. 154(b) by 264 days.

(21) Appl. No.: 17/135,944

(22) Filed: Dec. 28, 2020

(65) Prior Publication Data

US 2021/0115681 A1 Apr. 22, 2021

Related U.S. Application Data

(63) Continuation of application No. 15/538,571, filed as application No. PCT/IL2014/051114 on Dec. 21, 2014, now abandoned.

(51) Int. Cl.
  *E04F 15/18* (2006.01)
  *C08J 9/06* (2006.01)
  (Continued)

(52) U.S. Cl.
  CPC ............ *E04F 15/18* (2013.01); *B32B 5/18* (2013.01); *B32B 7/12* (2013.01); *B32B 13/12* (2013.01);
  (Continued)

(58) Field of Classification Search
  CPC . B29C 48/0011; B29C 48/0021; B29C 48/07; B29C 48/21; B29C 48/28; B29C 48/906; B29K 2105/04; B29K 2311/02; B32B 13/12; B32B 2264/06; B32B 2266/025; B32B 2266/08; B32B 2270/00; B32B 2274/00; B32B 2305/022; B32B 2307/7246; B32B 2307/7265;
  (Continued)

(56) References Cited

U.S. PATENT DOCUMENTS 5,310,513 A   5/1994   Yamamoto et al.
5,763,040 A   6/1998   Murphy et al.
(Continued)

FOREIGN PATENT DOCUMENTS

CA   2320471 A1   3/2001
CA   2386015 A1   9/2006
(Continued)

OTHER PUBLICATIONS

Canadian Patent Office; Office Action for Canadian Patent Application No. 2,971,811 dated Nov. 2, 2021, 3 Pages.
(Continued)

*Primary Examiner* — Hai Vo
(74) *Attorney, Agent, or Firm* — Christopher J. Knors; Moore & Van Allen PLLC (57) ABSTRACT

A moisture barrier layer-foamed polymeric composite sheet underlayment article comprising a foamed polymeric sheet and a moisture barrier layer adhered thereto is disclosed. In one aspect, cork particles are present in the composite.

11 Claims, 5 Drawing Sheets

(51) Int. Cl.

| | |
|---|---|
| *B32B 5/18* | (2006.01) |
| *B32B 13/12* | (2006.01) |
| *B32B 27/06* | (2006.01) |
| *B32B 27/08* | (2006.01) |
| *B32B 27/30* | (2006.01) |
| *B32B 27/32* | (2006.01) |
| *B32B 37/15* | (2006.01) |
| *C08J 9/00* | (2006.01) |
| *C08J 9/36* | (2006.01) |
| *B32B 7/12* | (2006.01) |
| *E04B 1/66* | (2006.01) |
| *B29K 311/02* | (2006.01) |
| *B29K 105/04* | (2006.01) |
| *B29C 48/21* | (2019.01) |
| *B29C 48/07* | (2019.01) |
| *B29C 48/90* | (2019.01) |
| *B29C 48/28* | (2019.01) |
| *B29C 48/00* | (2019.01) |
| *E04F 15/20* | (2006.01) |

(52) U.S. Cl.
CPC ............ *B32B 27/065* (2013.01); *B32B 27/08* (2013.01); *B32B 27/304* (2013.01); *B32B 27/306* (2013.01); *B32B 27/32* (2013.01); *B32B 37/153* (2013.01); *C08J 9/0061* (2013.01); *C08J 9/06* (2013.01); *C08J 9/36* (2013.01); *E04B 1/665* (2013.01); *B29C 48/0011* (2019.02); *B29C 48/0021* (2019.02); *B29C 48/07* (2019.02); *B29C 48/21* (2019.02); *B29C 48/28* (2019.02); *B29C 48/906* (2019.02); *B29K 2105/04* (2013.01); *B29K 2311/02* (2013.01); *B32B 2264/06* (2013.01); *B32B 2266/025* (2013.01); *B32B 2266/08* (2013.01); *B32B 2270/00* (2013.01); *B32B 2274/00* (2013.01); *B32B 2305/022* (2013.01); *B32B 2307/7246* (2013.01); *B32B 2307/7265* (2013.01); *B32B 2419/04* (2013.01); *B32B 2471/00* (2013.01); *C08J 2201/026* (2013.01); *C08J 2201/03* (2013.01); *C08J 2205/044* (2013.01); *C08J 2205/048* (2013.01); *C08J 2205/052* (2013.01); *C08J 2207/00* (2013.01); *C08J 2323/04* (2013.01); *C08J 2323/06* (2013.01); *C08J 2497/02* (2013.01); *E04F 15/20* (2013.01)

(58) Field of Classification Search
CPC ............ B32B 2419/04; B32B 2471/00; B32B 27/065; B32B 27/08; B32B 27/304; B32B 27/306; B32B 27/32; B32B 37/153; B32B 5/18; B32B 7/12; C08J 2201/026; C08J 2201/03; C08J 2205/044; C08J 2205/048; C08J 2205/052; C08J 2207/00; C08J 2323/04; C08J 2323/06; C08J 2497/02; C08J 9/0061; C08J 9/06; C08J 9/36; E04B 1/665; E04F 15/18; E04F 15/20
See application file for complete search history.

(56) References Cited

U.S. PATENT DOCUMENTS

| | | |
|---|---|---|
| 5,819,631 A | 10/1998 | Denney |
| 6,090,462 A | 7/2000 | Kanter |
| 6,130,174 A | 10/2000 | Hawley et al. |
| 6,143,118 A | 11/2000 | Hornaman et al. |
| 6,221,796 B1 | 4/2001 | Hawley et al. |
| 6,540,865 B1 | 4/2003 | Miekka et al. |
| 6,599,599 B1 | 7/2003 | Buckwater et al. |
| 6,607,803 B2 | 8/2003 | Foster |
| 6,673,177 B2 | 1/2004 | Buckwalter et al. |
| 6,854,241 B1 | 2/2005 | Pelosi, Jr. |
| RE38,745 E | 6/2005 | Foster |
| 7,047,705 B2 | 5/2006 | Foster |
| 7,148,160 B2 | 12/2006 | Porter |
| 7,601,653 B2 | 10/2009 | Price |
| 7,658,040 B2 | 2/2010 | Bennett et al. |
| 7,786,028 B2 | 8/2010 | Souther et al. |
| 7,827,751 B2 | 11/2010 | Plante |
| 8,007,886 B2 | 8/2011 | Tierney et al. |
| 8,129,450 B2 | 3/2012 | Wood et al. |
| 8,283,017 B2 | 10/2012 | Bieser et al. |
| 8,349,448 B2 | 1/2013 | Yokoyama et al. |
| 8,496,769 B2 | 7/2013 | Brumbelow et al. |
| 8,501,310 B2 | 8/2013 | Fujii et al. |
| 8,691,360 B2 | 4/2014 | Pacione |
| 8,833,028 B2 | 9/2014 | Whispell et al. |
| 8,846,774 B2 | 9/2014 | Jintoku et al. |
| 9,062,166 B2 | 6/2015 | Zur et al. |
| 2002/0155274 A1* | 10/2002 | Ramesh ................. B32B 27/32 428/317.1 |
| 2003/0021979 A1 | 1/2003 | Ramesh et al. |
| 2004/0103607 A1* | 6/2004 | Kunzel ................... E04B 1/625 428/479.3 |
| 2006/0179752 A1* | 8/2006 | Swanson ................. B32B 21/08 52/403.1 |
| 2011/0129656 A1 | 6/2011 | Zur et al. |
| 2011/0306691 A1 | 12/2011 | Sosa et al. |
| 2014/0033532 A1 | 2/2014 | Yoshimura |
| 2014/0335321 A1 | 11/2014 | Reisman et al. |
| 2016/0152784 A1* | 6/2016 | Fillot ..................... B32B 21/08 428/479.6 |

FOREIGN PATENT DOCUMENTS

| | | | |
|---|---|---|---|
| WO | 2006058093 A1 | 6/2006 | |
| WO | WO-2015009440 A1 * | 1/2015 | ............... B32B 3/14 |

OTHER PUBLICATIONS

CIPO; Office Action for Canadian Patent Application No. 2,971,811 dated Mar. 16, 2021, 4 Pages.

WIPO, International Search Report and Written Opinion for International Application No. PCT/IL2014/051114, dated Jan. 2015, 10 pages.

European Patent Office; Extended European Search Report for European Application No. 14908901.3 dated Jul. 19, 2018, 9 Pages.

* cited by examiner

POLYMER FOAM SHEET AND BARRIER LAYER COMPOSITE

TECHNICAL FIELD

This invention generally relates to a foamed polymeric sheet and moisture barrier layer composite and methods of continuously forming and using same as an underlayment for flooring. In one aspect, the composite comprises cork particles.

BACKGROUND

In the construction of buildings having subfloors, it is known to install an underlayment. Underlayments can include one or more polyethylene films or sheets that may be foamed.

For producing a foamed sheet, a resin composition in a die is forced into a narrow passage having a small cross-sectional area. Strong shearing force acting the resin or stagnation occurring at the die makes the manufacture of thin foam sheets difficult, e.g., less than 8 mm.

Likewise, a partially foamed product extruded from a die may be bent or bowed, or its surface may be cracked, thus causing a difficulty in the manufacture of foams, especially thin foam sheets and especially manufacturing of such forms continuously.

The prior art does not reasonably disclose a continuous method for cross-sectionally cutting (profile cut) a compressible or cellular polyolefin polymer material and laminating with a moisture barrier layer on at least one of the surfaces resulting from the cutting. Nor does the prior art disclose a composite comprising a profile cut thin polyolefin polymer foam with cork particles process to include a moisture barrier layer.

SUMMARY

In accordance with a first embodiment of the present disclosure, a composite is provided. The composite comprising a foamed polymeric sheet having a first surface and a second surface; and a moisture barrier layer adjacent at least one of the first and the second surfaces. In one aspect of the first embodiment, the foamed polymeric sheet is at least partially cross-linked.

In one aspect, alone or in combination with any one of the other aspects of the first embodiment, the foamed polymeric sheet comprises cork particles. In another aspect, alone or in combination with any one of the other aspects of the first embodiment, the foamed polymeric sheet comprises cork particles in an amount of between 1 PHR to 50 PHR.

In another aspect, alone or in combination with any one of the other aspects of the first embodiment, the composite of any one of the previous claims, wherein the foamed polymeric sheet comprises a first average foam cell diameter distribution and a second average foam cell diameter distribution of foam cells less than the first average foam cell diameter distribution. In another aspect, alone or in combination with any one of the other aspects of the first embodiment, the ratio of the first average foam cell diameter distribution to the second average foam cell diameter distribution is at least 6:1, or at least 10:1.

In another aspect, alone or in combination with any one of the other aspects of the first embodiment, the first average foam cell diameter distribution is between 300 micron to 3500 micron and the second average foam cell diameter distribution is 1 micron to 50 micron.

In another aspect, alone or in combination with any one of the other aspects of the first embodiment, the cork particles are of an average particle size of 300 micron to 1200 micron and the foamed polymeric sheet comprises an average foam cell diameter is between 500 micron to 3500 micron, or the cork particles are of an average particle size of 500 micron to 1000 micron and the foamed polymeric sheet comprises an average foam cell diameter between 600 micron to 1500 micron.

In one aspect of the second embodiment, the foamed polyolefin film layer is a low density polyethylene.

In another aspect, alone or in combination with any one of the other aspects of the first embodiment, the moisture barrier layer comprises at least one of: a co-extruded thermoplastic-thermoplastic laminate film, a co-extruded thermoplastic-polyolefin vinyl acetate film, a co-extruded polyolefin-polyolefin laminate film, a co-extruded polyolefin-polyolefin vinyl acetate film, a co-extruded thermoplastic-cellulose laminate film, and a co-extruded cellulosic-polyolefin vinyl acetate film.

In another aspect, alone or in combination with any one of the other aspects of the first embodiment, at least a portion of the moisture barrier layer extends beyond at least one edge of the foamed polymer sheet. In another aspect, alone or in combination with any one of the other aspects of the first embodiment, the at least a portion of moisture barrier layer extending beyond at least one edge of the foamed polymer sheet comprises an adhesive.

In accordance with a second embodiment of the present disclosure, a composite is provided. The composite comprising at least partially cross-linked foamed polymeric sheet comprising cork particles in an amount of between 1 PHR to 50 PHR; and a moisture barrier layer adhered to at least one side of the foamed polymeric sheet, wherein the moisture vapor barrier layer is selected from a thermoplastic film or a co-extruded thermoplastic-thermoplastic laminate film.

In another aspect, alone or in combination with any one of the other aspects of the second embodiment, the moisture vapor barrier layer is a co-extruded layer. In another aspect, alone or in combination with any one of the other aspects of the second embodiment, the moisture vapor barrier layer is selected from a co-extruded thermoplastic-polyolefin vinyl acetate film, a co-extruded polyolefin-polyolefin laminate film, a co-extruded polyolefin-polyolefin vinyl acetate film, a co-extruded thermoplastic-cellulose laminate film, or a co-extruded cellulosic-polyolefin vinyl acetate film.

In another aspect, alone or in combination with any one of the other aspects of the second embodiment, the foamed polymeric sheet comprises a first average foam cell diameter distribution and a second average foam cell diameter distribution of foam cells less than the first average foam cell diameter distribution. In another aspect, alone or in combination with any one of the other aspects of the second embodiment, the ratio of the first average foam cell diameter distribution to the second average foam cell diameter distribution is at least 6:1, or is at least 10:1.

In another aspect, alone or in combination with any one of the other aspects of the second embodiment, the first average foam cell diameter distribution is between 300 micron to 3500 micron and the second average foam cell diameter distribution is 1 micron to 50 micron.

In another aspect, alone or in combination with any one of the other aspects of the second embodiment, the cork particles are of an average particle size of 300 micron to 1200 micron and the foamed polymeric sheet comprises an average foam cell diameter is between 500 micron to 3500 micron, or the cork particles are of an average particle size of 500 micron to 1000 micron and the foamed polymeric sheet comprises an average foam cell diameter between 600 micron to 1500 micron.

In another aspect, alone or in combination with any one of the other aspects of the second embodiment, the moisture barrier layer extends beyond the at least one edge of the foamed polymer sheet. In another aspect, alone or in combination with any one of the other aspects of the second embodiment, the at least a portion of moisture barrier layer extending beyond at least one edge of the foamed polymer sheet comprises an adhesive.

In accordance with a third embodiment of the present disclosure, a barrier layer-foamed polymeric sheet underlayment composite article is provided. The article comprising a foamed polymeric sheet; and a moisture barrier layer adhered to the foamed polymeric sheet, the moisture vapor barrier layer having: a polyolefin film layer; and at least one co-extruded layer posited between the polyolefin film layer and the foamed polymeric sheet, the at least one co-extruded layer configured to adhere to the foamed polymeric sheet.

In a first aspect of the third embodiment, the foamed polyolefin film layer comprises cork particles. In a second aspect, alone or in combination with any of the previous aspects of the third embodiment, the at least one co-extruded layer is selected from a co-extruded thermoplastic-thermoplastic laminate film, a co-extruded thermoplastic-polyolefin vinyl acetate film, a co-extruded polyolefin-polyolefin laminate film, a co-extruded polyolefin-polyolefin vinyl acetate film, a co-extruded thermoplastic-cellulose laminate film, or a co-extruded cellulosic-polyolefin vinyl acetate film.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

The present disclosure concerns the development of polyolefin polymeric foams providing functionality to the underlayment. Polymeric foams having a moisture barrier on one or more surfaces provides various advantages, for example, as an underlayment for flooring, soundproofing, insulation, hard floor padding, etc. In one aspect, the floor-side (or sub-floor) of the foamed sheet comprises moisture barrier layer that controls moisture flow between the sub-floor (or substrate) and the flooring itself. The present arrangement of an adhered barrier layer laminate prevents degradation to the flooring/subflooring e.g., by minimizing moisture damage.

Thus, the present disclosure provides a polymeric sheet comprising a first side and a second side opposed to the first side; and (b) a laminate barrier layer on at least one side. The sheet can be at least partially cross-linked and/or foamed. The polymeric sheet can be of thermoplastic, a curable elastomer, or thermoplastic elastomer. The foamed sheet can be a closed-cell foam structure. The foamed sheet cork particles. Manufacturing methods of preparing the laminate barrier layer-foamed polymeric sheet are provided. In one aspect, the manufacturing is continuous.

As used in the specification and claims, the forms "a", "an" and "the" include singular as well as plural references unless the context clearly dictates otherwise. For example, the term "a polyolefin" includes one or more polyolefin resins, and the term "polyolefins" includes one polyolefin resin as well as more than one type of polyolefin resin. As used herein, the term "or" means one or a combination of two or more of the listed choices.

Further, as used herein, the term "comprising" is intended to mean that the polymeric foam and processes disclosed herein include the recited elements, but does not exclude others. For example, when referring to foam comprising a chemically cross-linked polyolefin, the foam may as well include other additives, such as a dye and/or cork particles. Similarly, "consisting essentially of" is used to define foams and processes that include the recited elements but exclude other elements that may have an essential significance on the functionality of the resulting sheet. For example, a foam consisting essentially of cross-linked polyolefin will not include or will include only insignificant amounts (amounts that will have an insignificant effect on physical properties of the foam) of other elements. "Consisting of" shall mean excluding more than trace amounts of other elements. Embodiments defined by each of these transition terms are within the scope disclosed herein.

Further, all numerical values, e.g., concentration or parts per hundred parts resin (PHR) or ranges thereof, are approximations which are varied (+) or (−) by up to 20%, at times by up to 10%, from the stated values. It is to be understood, even if not always explicitly stated that all numerical designations are preceded by the term "about". It also is to be understood, although not always explicitly stated, that the reagents described herein are merely exemplary and that equivalents of such are known in the art.

The term "chemically crosslinked" in the context of the present disclosure is used to denote that the polymer chains are inter-connected by a plurality of covalent bonds and that the covalent bonds are stable mechanically and thermally. Chemically crosslinked methods encompass peroxide or azo cross-linking, and silane-cross-linking methods. The term "physical crosslinking" is used to denote high-energy methods of crosslinking, such as e-beam, gamma, x-ray and UV methods. The extent of such cross-linking can be determined with conventional methods, such as solvent swelling. In one aspect, the extent of crosslinking of the presently disclosed underlay is about 50 to about 90% as measured by solvent swelling techniques. In one aspect of the present disclosure, physical crosslinking is not used.

The polymeric foam according to the present disclosure comprises closed-cell polymeric foam. The term "closed cell", in contrast to "open cell", is known to a skilled person and means that essentially all cell walls of the foam are undamaged. Preferably, at least 90% of the cells have undamaged cell walls, more preferably at least 95%, even more preferably more than 98%.

In accordance with an embodiment of the invention, the closed cell's average diameter is between 100 micron and 5000 micron, preferably between 500 micron and 3500 micron, even more preferably between 600 micron and 1500 micron.

The term "blowing agent" is known in the art and refers to any substance which alone or in combination with other substances is capable of producing a cellular structure in a polymeric or other material. Blowing agents may include chemical blowing agents or physical blowing agents. Chemical blowing agents include, for example, chemical agents that decompose or react under the influence of heat to form a gas. Chemical blowing agents range from simple salts such as ammonium or sodium bicarbonate to complex nitrogen releasing agents. Physical blowing agents include compressed gases that expand when pressure is released and liquids that develop cells when they change to gases.

The polymeric sheet can be a thermoplastic, thermoplastic elastomer, or composite or alloys. The polymeric sheet can comprise at least one polyolefin. As appreciated by those versed in chemistry, "polyolefins" are a class of organic substances prepared by the addition polymerization of alkene (hydrocarbons containing at least one carbon-carbon double bond per molecule), especially ethylene and propylene. The polymeric sheet of the present invention can employ one or more polyolefins, and the one or more polyolefins may be combined with one or more other polymers. Thermoplastic elastomers and alloys (e.g. thermoplastic vulcanizates such as SANTOPRENE™) include polyolefin-based (EPDM), styrene-butadiene-styrene-, styrene-isoprene-styrene-, styrene-butadiene-, and styrene-isoprene elastomers can also be used.

In accordance with one embodiment disclosed herein, the polymeric sheet is at least partially cross-linked and foamed. The forming part of the polymeric foam is characterized by a melt index of the raw material, namely, the polymer in its melt form prior to being chemically cross-linked with the same or another polymer, of between 0.3 and 20, preferably between 0.7 and 5. Other melt index ranges can be used suitable for the polymer chosen.

In one aspect, the polymeric sheet is a homopolymer or a copolymer of any $C_2$ to $C_{20}$ olefin. In accordance with one embodiment, the polyolefin is a copolymer of ethylene and an alpha-olefin selected from of iso-propene, butene, iso-pentene, hexane, iso-heptene and octane. An example of such a copolymer includes, e.g., a metallocene polyolefin, such as ENGAGE™ (Dow Chemical) or EXACT™ (ExxonMobil).

There are a variety of polyolefins which exhibit the above melt index and thus may be used to form the polymeric foam disclosed herein. A non-limiting list of possible polyolefins comprises high density polyethylene (HDPE), Medium density PE (MDPE), low density PE (LDPE), linear low density PE (LLDPE), Metallocene-PE, poly-1,2-butadiene, ethylene propylene copolymer, ethylene butane copolymer, ethylene vinyl acetate (EVA) polymers, copolymers of ethylene with up to 45% of methyl, ethyl, propyl or butyl acrylates or methacrylates, and mixtures of two or more of the above mentioned polymers.

Polyolefins for chemical cross-linking to form polymeric foams are readily available in the market. For example, polyolefins may be purchased from Carmel Olefins, ExxonMobil, Borealis, Dow, Dupont, Equistar, Mitsui Chemicals, Sabic etc. According to one preferred embodiment, the at least one polyolefin is LDPE with a melt index of 0.7-4.

In one aspect, the foamed polymeric sheet disclosed herein comprises dispersed or distributed cork particles. In one aspect, a laminate barrier layer and an at least partially cross-linked polymeric foam sheet comprising an amount of cork particles is provided. As appreciated by those versed in the art, cork is a unique material in that it is made of air-filled, watertight cells which make the cork an effective, light in weight, insulating medium. The term "cork particles" denotes naturally occurring as well as recycled cork. The cork particles may have a common, regular shape, or irregular shapes. The irregular shape may be obtained by chopping or dicing larger cork pieces to form cork chips, pellets, granules etc. In accordance with one embodiment, the cork particles have an average bulk density of 60-140 $kg/m^3$, and an average diameter of between about 100 micron and 3000 micron, or an average diameter of between 500 micron and 2000 micron. In one aspect, the cork particles have an average bulk density of 70-80 $kg/m^3$, and an average diameter of between about 100 micron and 3000 micron, or an average diameter of between 500 micron and 2000 micron. Cork material is readily available in the market and can be purchased, for example from Amorim (de Lamas, Portugal).

In accordance with an embodiment, cork particles can be added to the polymer prior to cross linking, foaming, and laminating, at an amount of between about 0.1 to about 25 parts per hundred parts (PHR), or preferably 1-15 PHR or even more preferably 2.5-10 PHR, of the total amount of polyolefin present in the polymeric foam. Other concentrations may be used provided that the amount of cork does not materially affect the structure, function, resiliency, of the foamed polymeric sheet. For example, the amount and/or particle size of the cork can affect the visual appearance of the produced sheet, e.g., perforations, cracks, holes, etc, or it physical properties, e.g. tensile strength, elongation, or compression set.

The foamed polymeric sheet disclosed herein has the advantage that it may be produced as a continuous sheet, without exhibiting the aforementioned perforations and other defects typically encountered when attempting to manufacture continuous sheets of polymeric materials. The polymeric sheet is producible at a thickness of between 2 mm-20 mm and at any length above 2 m. In one aspect, the foamed polymeric sheet is at least partially crosslinked. In yet another aspect, the polymeric sheet is at least partially cross-linked and then foamed.

In addition to the above-mentioned characteristics, the foamed polymeric sheet disclosed herein may be characterized by one or more of the following properties:

it has a compression set under constant force in air of between 5 and 50% measured after 24 hrs;

it has a tensile strength of between 50 and 80 p.s.i. (345 kPa and 552 kPa);

it has an elongation at break of between 30 and 500%;

it has a compressive stress (deflection at 25%) of between 2 and 20 p.s.i. (13.8 kPa and 138 kPa); and/or it has a compressive stress (deflection at 50%) of between 5 and 40 p.s.i. (34.5 kPa and 276 kPa)

The polymeric composition used to form the foamed sheet disclosed herein may comprise additives typically used in polymer industry. Such additives may include, with out being limited thereto, one or more of a dye, such as a color masterbatch; a stiffener, such as high-density polyethylene HDPE; a softener such as EVA; an antioxidant such as BHT; an anti-fungal such as nano silver particles; an anti-static such as GMS; ultra violet resistant additives; an inorganic filler, such as calcium carbonate; an organic filler, such as Corn starch or cellulosic material; a chemical blowing agent (an agent that alone or in combination with other substances is capable of producing a cellular structure in a polymer) such as azodicarbonamide; a co-activator of the chemical blowing agent (catalyst or activator of the foaming agents to lower temperatures) such as zinc oxide; a conducting agent, such as Conductive carbon black, a halogenated flame retardant agent, such as dibromodiphenyl ether or a non halogenated flame retardant such as magnesium hydroxide, a silanol condensation catalyst, etc.

The foamed polymeric sheet disclosed herein may have various applications as discussed above. In accordance with one embodiment, the embossed polymeric sheet disclosed herein is used as underlayment with soft and hard flooring surfaces, e.g. wood floors (residential or commercial) or other floor covering, e.g., tile laminate flooring, wood flooring, floating floors, peel-and-stick flooring, etc. In addition, the sheet disclosed herein can also be used with stone flooring surfaces such as ceramic, cement, etc. In one embodiment, the foamed polymeric sheet is laminated to provide a moisture barrier.

A moisture vapor barrier layer is next applied to an upper surface of the foamed polymeric sheet. "Moisture vapor barrier" means that the layer is substantially moisture vapor impervious. Some trace amount of moisture may penetrate through the layer after it is adhered to the foamed polymeric sheet layer, but the layer prevents moisture vapor from penetrating through the layer and into the foamed polymeric sheet layer.

The moisture vapor barrier layer may be a casted or blown film, or a laminate film having a thickness between about 10 micron to about 500 micron. The film must have sufficient bond strength, elongation and tensile strength to conform to and remain on the upper surface of the foamed polymeric sheet when rolled or otherwise installed. Suitable moisture vapor impervious layers include polyethylene-ethylene vinyl acetate laminate films, polyolefin-polyvinyl acetate (PVA) films, polyolefin-polyvinyl chloride (PVC) films, and polypropylene-polyvinyl acetate, cellulose, cellulose acetate, polyester, polyamide, polybutadiene, polycarbonate, and copolymers thereof.

Preferably, the moisture vapor barrier layer is applied with a hot roll laminator, known to those of skill in the art. The moisture vapor barrier layer may also be adhered to the upper surface of the base layer with a flame. Once the barrier layer has been adhered to the base layer, the underlayment structure provides a low moisture vapor flow through the product.

As disclosed herein, in a first embodiment, the method for manufacturing a continuous sheet comprising an exemplary moisture barrier layer and an at least partially cross-linked, foamed polymeric sheet, as described. A continuous process, where each step is continuously operated, thereby allowing the formation of a continuous, composite sheet can be employed. In one aspect, the entire process is continuous, including the adhering of the moisture barrier laminate. In another aspect, the adhering of the moisture barrier laminate can be performed as a separate process.

Thus, (raw) materials comprising at least one polyolefin resin, optionally, at least one cross-linking agent, and optionally, at least one blowing agent, are continuously fed into a mixing arrangement set at a temperature of between 60° C. and 200° C. to form a homogeneous molten blend (at times referred to by the term "homogenous melt").

The homogenous melt is fed into an extrusion line, constructed to form from the homogenous melt, a continuous polymeric sheet. The continuous polymeric sheet is optionally transferred into a heating module for heating the continuous sheet to a first temperature at which at least partial cross-linking of the polymeric resin can be performed, albeit being lower than the temperature required for activating the blowing agent. In at least one aspect, a cross-linking agent is used, and as a result, a cross-linked polyolefin sheet is obtained.

Optionally, the present method comprises elevating the temperature within the heating module or in a separate oven, thereby further heating the polymer sheet (or cross-linked sheet) to a second temperature at which the optional blowing agent present in the melt can be activated. In at least one aspect, a blowing agent is used and as a result, a continuous, foamed polymeric sheet is obtained. In yet another aspect, a cross-linking agent is used and a blowing agent is used, and as a result, a continuous, at least partially cross-linked, foamed polymeric sheet is obtained.

In accordance with a first embodiment, raw material comprises also one or more additives selected from a dye, a stiffener, a softener, a plasticizer, an antioxidant, an anti-fungal, an anti-static, an ultra violet resistant additive, an inorganic filler, an organic filler, a chemical blowing agent kicker, a conducting agent, and a flame retardant agent, as will be further discussed below.

Raw materials are mixed at a temperature of between about 60° C. and about 200° C. and more specifically, from about 80° C. to about 150° C., so as to allow the formation of a molten blend in which the various constituents are homogenously dispersed in the blend.

The homogenous melt may be obtained by using a variety of mixers known in the polymer industry. Some exemplary, non-limiting mixers include a Banbury mixer, a dispersion mixer, a batch mixer, an internal Mixer, a kneader and others. As appreciated by those versed in the art, mixing in the mixer may take from about several seconds to about several minutes until the homogenous molten blend is obtained. Once ready, the homogenous melt is transferred, via, e.g. a feed hopper, into an extrusion line.

A typical extrusion line may consist of the raw material feed hopper, a single extruder or a combination of extruders connected in a series, an extrusion die, a calibration unit, and haul-off. The extruders typically comprise a heated barrel containing therein a single or plurality of rotating screws. The extrusion line may include a single extruder or combinations of extruders which may be any one of the extruders known in the polymer industry, including, without being limited thereto, single screw extruder, tapered twin extruder, tapered twin single extruder, twin screw extruder, multi-screw extruder. The extrusion line may also comprise a sheet pre-forming machine. The melt moves from the back of the screw to the head of extrusion die channel in which the melt is simultaneously heated, mixed and pressurized to take up an approximate shape of a sheet.

In one aspect, when the crosslinking agent is employed, the continuous sheet is transferred to a heating arrangement comprising a cross-linking module in which the chemical cross-linking is initiated. When a blowing agent is used in combination with the cross-linking agent, the at least partially cross-linked sheet is continuously introduced into a blowing module in which the blowing agent is activated resulting in the at least partially chemically cross-linked foamed polymeric sheet. The sheet may be cooled or heated between the cross-linking module and the blowing module, e.g., chill/hot rolls, serpentine rollers, etc. Heating in either module can be via conduction, convection, or infra-red means conventionally employed in the art.

The cross-linking module comprises a conveyer oven adapted to heat the continuous sheet to a first temperature which permits being lower than that required for activating the blowing agent, if included a priori in the raw blend.

According to one embodiment, the conveyer oven is a horizontal oven typically of a length of 10-50 meters, however, other lengths can be used. The oven is equipped with a moving belt (e.g. stainless steel belt) which slowly transports the sheet at a temperature range which induces either cross-linking or blowing or both (in two distinct sections). According to one embodiment, the temperature range (the said first temperature) is between about 70° C. and about 160° C. so as to activate and induce cross-linking. It is noted that the oven can have a fixed temperature or a temperature gradient. The belt transports the sheet at a speed that is variable and is determined upon by the density and thickness of the foam to be produced. Other ovens, e.g., a salt bath or Teflon roll oven and the like and/or heating configurations can be used to heat the extruded sheet to provide for crosslinking and foaming.

A variety of cross-linking agents may be included in the melt, so as to allow cross-linking of the at least one polyolefin in the melt. Typically used to this end are peroxides (compounds containing an oxygen-oxygen single bond). A non-limiting list of peroxide-based cross-linking agents comprises dicumyl peroxide, di-t-butyl peroxide, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butyl perbenzoate, t-butyl peroxyisopropyl carbonate, diacetyl peroxide, lauroyl peroxide and t-butyl cumyl peroxide.

In one aspect, a peroxide based cross-linking agent in accordance with the present disclosure is dicumyl peroxide. The cross-linking agent may alternatively be an organosilane linker and a silanol condensation catalyst. For example, the one step "Monosil" process can be used, or alternatively, the two step "Sioplas" technology can be employed. For those knowledgeable in the art, either method can be utilized to produce silane-crosslinked polyolefinic foams.

The blowing module, e.g., for creating the voids in the polymer, may constitute a second conveyer oven or a second portion of the conveyer in which cross-linking has occurred. The blowing module is adapted to continuously receive and to heat the sheet (cross-linked or non-cross-linked) to a second temperature capable of activating the blowing agent. The second temperature is typically higher than that required for cross-linking so as to avoid foaming during the cross-linking process. Typically, the second temperature, according to one embodiment, is between about 150° C. and 250° C.

The blowing agent in one aspect is a chemical blowing agent. A non-limiting list of chemical blowing agents comprise azodicarbonamide, barium azodicarboxylate, azobisisobutyronitrile, and azodicarboxylic amide, nitroso compounds, such as N,N'-dinitrosopentamethylenetetramine, N,N'-dimethyl-N,N'-dinitrosoterephthalamide, and trinitrotrimethyltriamine, hydrazide compounds, such as 4,4'-oxybis(benzenesulfonylhydrazide), paratoluenesulfonylhydrazide, diphenylsulfone-3,3'-disulfonylhydrazide, and allylbis(sulfonylhydrazide), semicarbazide compounds, such as p-toluilenesulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole. In one aspect, the blowing agent in accordance with the present disclosure is azodicarbonamide.

It is to be appreciated by those versed in the art that the cross-linking and blowing may take place in two different conveyer ovens, or in a single conveyer oven having a first section being heated to the first temperature where cross-linking takes place, either as a fixed temperature or as a gradient and a second section receiving the cross-linked polymer, and having a second temperature, either as a fixed temperature or as a gradient, where the blowing agent is activated and foaming of the cross-linked sheet takes place.

The temperatures in the two different ovens or in the two sections of a single oven and the transport velocity of the transporting belts are adjusted, so that the cross-liking process is brought to a predetermined level (e.g., completely or at least partially) before the blowing process takes place.

According to one embodiment, the cross-linking temperatures are in the range of 120° C. to 150° C. During the cross-linking stage, the polymer sheet is softened, crosslinking takes place, and the melt strength goes up enough so that when, towards the end of the oven (or the first section of the oven), the temperatures can be raised up to a predetermined temperature capable of activating the blowing agent or providing a material that can be foamed. The predetermined temperature of the second oven or second section are typically greater than that of the first oven or first section. In one aspect, the predetermined temperature of the second oven or second section is over 200° C. (typically in the range of 220° C.-250° C.). At this temperature the foaming occurs and the sheet material comes out of the oven as a foam sheet.

The continuous rolled sheet may be aged for a sufficient period of time for optimal annealing and relaxation before performing further processing such as welding, laminating of materials etc. as further described below with reference to the different applications of the continuous rolled sheet. It is noted that instead of rolling, the continuous polymeric foamed sheet exiting the conveying oven may be cooled and sliced into blocks or sheets (or rolls) of fixed length for storage.

A variety of combinations of raw materials may be used to form the continuous sheet in accordance with the present disclosure. In an exemplary embodiment, a continuous sheet of at least partially cross-linked foamed polymer is prepared using materials comprising a mixture of at least one polyolefin resin, 0.2-25 PHR (preferably 2-20, more preferable, 5-15) of chemical blowing agent blowing agent, 0.1-2 PHR (preferably 0.4-1.2) of a cross-linking agent, and 0-3 PHR (preferably 0.1-1) of a dye (color Masterbatch can be used). In one aspect, 0.1-25 parts by weight per hundred parts (PHR) (preferably 1-50 PHR, more preferably 2.5-25 PHR) of cork particles can be added. If cork particles are used, in one aspect, the raw material comprises 2.5-10 PHR cork particles.

In accordance with the same or other embodiments, the raw materials may comprise 5-15 PHR of chemical blowing agent. Alone or in combination with the chemical blowing agent, the raw materials may comprise 0.4-1.2 PHR of a cross-linking agent.

Figure 1:
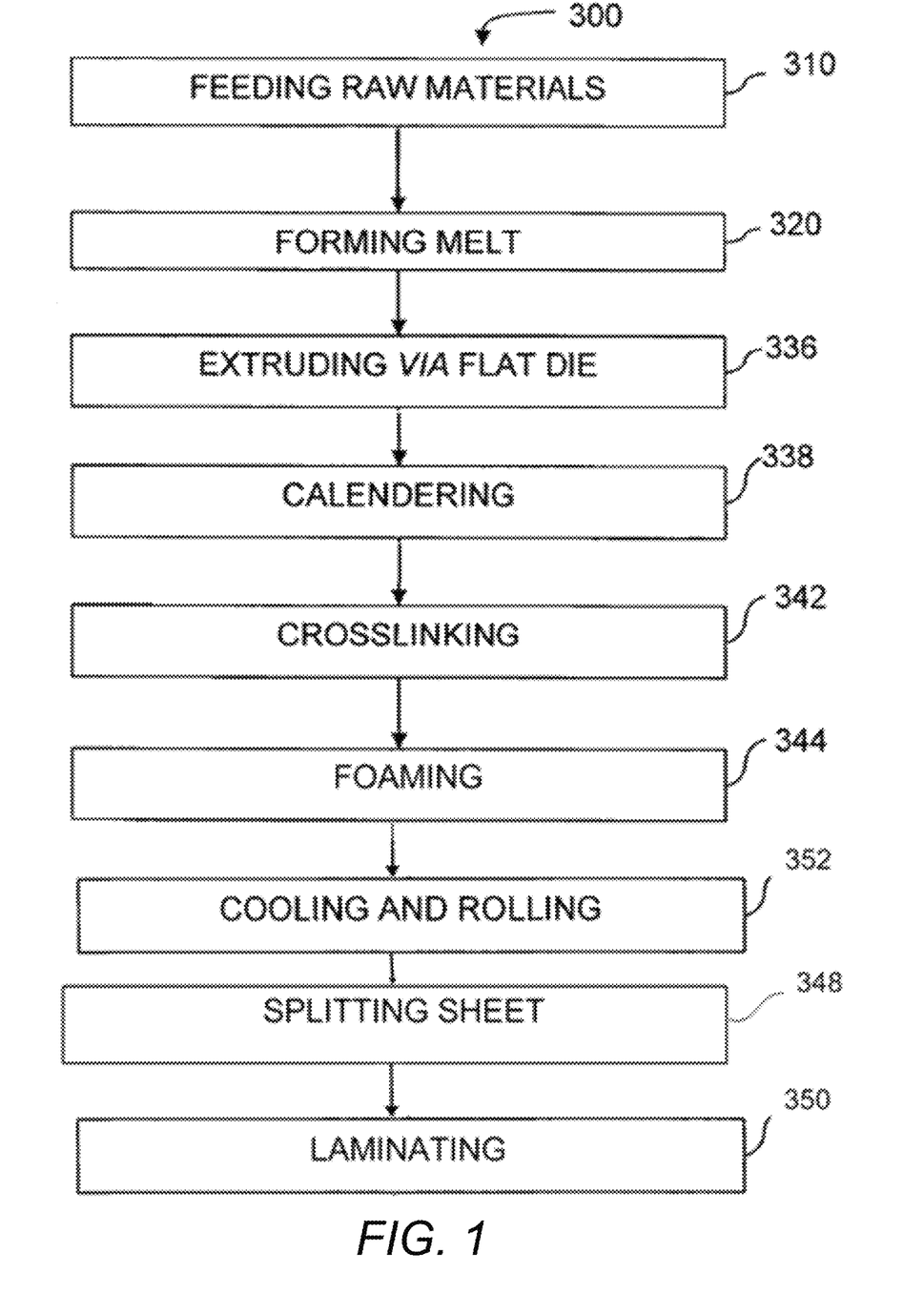
FIG. 1 is a schematic flow diagram illustrating an exemplary process in accordance with the broadest aspect of the present disclosure.

Specifically, FIG. 1 illustrates a process 300 where firstly the mixture of raw materials comprising at minimum at least one material, e.g., polyolefin resin, a cross-linking agent and a blowing agent that is fed, e.g., into a mixer (Step 310). The mixer may be any commercial mixer available in the industry, some examples of same provided hereinabove. The mixer (310) includes, in addition to the at least one polyolefin, the blowing agent and a radical generator such as a peroxide, and may include cork particles and/or colorant, and or filler. In one aspect, the mixture comprises an amount of cork particles.

The mixer is also configured to convey heat at a temperature of between about 80° C. to about 150° C. Thus, while being continuously mixed, the raw materials melt while they are homogenized into a melt (320). Once an essentially homogeneous melt is obtained and the temperature of the melt and the mixer inner chamber are essentially the same (although these criteria may vary, depending on the raw materials used), the melt is transferred (fed) into an extrusion line set to exert heat onto the melt received and contained therein at a temperature of between about 80° C. to about 200° C. The molten blend is then extruded via a flat die (Step 336) in the form of a continuous sheet.

The uniformly produced continuous sheet exiting optional calendaring (Step 338) is transferred to a conveyer oven which is set at a temperature sufficient for commencing crosslinking (Step 342) of the polymers in the continuous sheet, and following in line, a second section, which is set at a temperature sufficient for activating the blowing agent and blowing the received, chemically cross-linked polymeric sheet, to obtain the respective foamed sheet (Step 344). The sheet can then be split into 2 sheets of essentially equal (Step 348) thickness or of different thickness. The sheet can then be laminated (Step 350) followed by cooling on chiller rolls and the cooled continuous sheet is then wound on a core.

Figure 2:
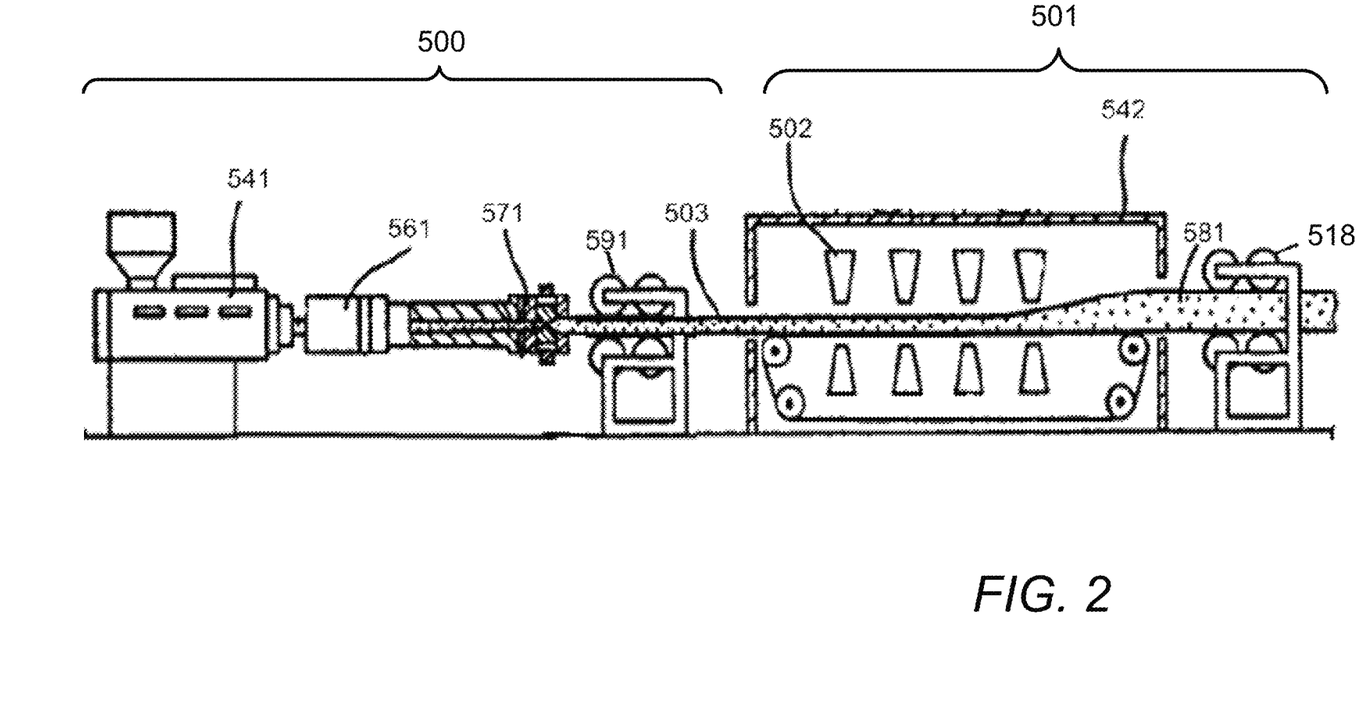
FIG. 2 is a schematic continuous foam sheet production process in accordance with an exemplary aspect of the present disclosure.

Reference is now made to FIG. 2 which shows an exemplary process 500 (mixing raw materials and extrusion) and process 501 (crosslinking/foaming). Thus, raw material is added to mixer 541 to provide blended or mixed material to extruder 561. Extruder 561 is shown with sheet die 571 for directly extruding the continuous sheet 503. Other dies can be used, e.g., for extruding a continuous sleeve having a uniform annular wall thickness. If a sleeve die is used, the continuous sheet may be formed by cutting through the sleeve wall immediately following the extrusion of the sleeve. Such an extruded form can optionally be sent through calender rolls 591 to adjust the thickness and/or width of sheet 503. As shown, exemplary extruded sheet 503 is a generally planar, continuous sheet, but other extruded shapes may be formed using the method of the present disclosure. The continuous sheet will typically have an uncured, unfoamed thickness that may range from about 39 mil (1 millimeter) to about 236 mil (6 millimeter) or thicker.

Sheet 503 is passed to a first oven or first section 502 for activation of the cross-linking agent, if one is used. Sheet 503 then exits first oven 502 and, if a blowing agent is employed, enters second oven or second section 542 having a higher temperature than first oven 502. Foaming of the sheet occurs and foamed sheet 581 of greater thickness than sheet 503 exits second oven 542. Drive rolls 518 take up and can optionally cool/heat foamed sheet 581.

Alternatively, an e-beam or other high energy source can be used in place of the oven and peroxide. Alternatively, a silane-grafted polyolefin can be used, and the oven can be configured to provide moisture, e.g., via steam, to promote silane cross-linking.

Figure 3:
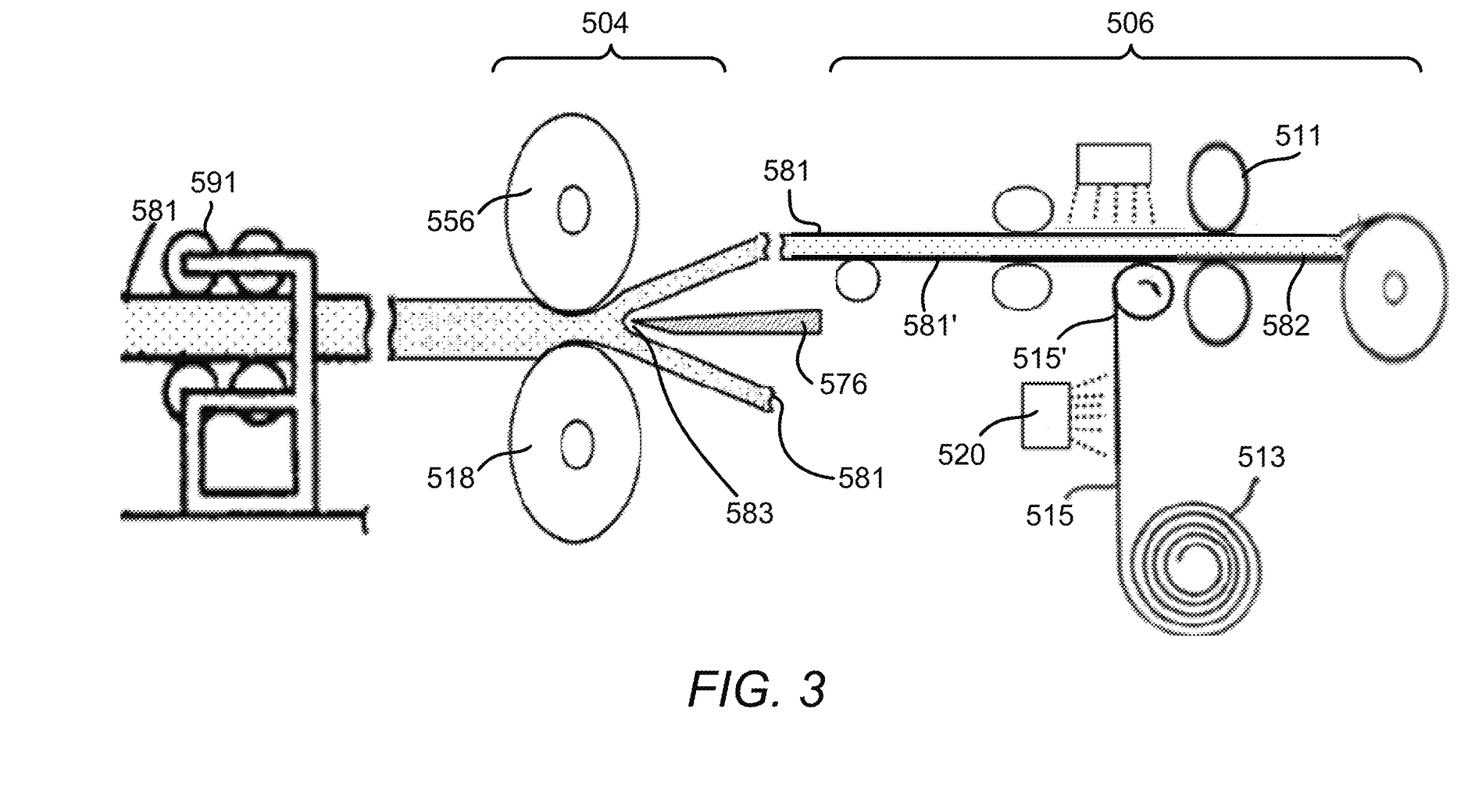
FIG. 3 is a schematic of a cutting and lamination process of the continuous foam sheet production process in accordance with the broadest aspect of the present disclosure.

With reference to FIG. 3, cutting and laminating operations 504, 506 are depicted and discussed below. In cutting operation 504, foamed polymer sheet 581 may be cut using conventional cutting material such as a blade or a hot wire cutter. A slab of such material is cut by moving the slab relative to the blade or one or more hot wires, for example. The blade may be stationary or rotatable about a fixed plane relative to the extruded sheet.

At least one compression rollers 556 is positioned close to the outer surface of a drive roller 518 to define a predetermined gap. The roller 556 position is adjustable, such that the outer surface of the roller may be closer or farther from the outer surface of the drive roller 518 to change the gap. Foamed polymer sheet 581 is fed into the gap set to a distance that causes the compressible material to be at least slightly compressed between the outer surface of the compression roller 556 and drive roller 518.

A knife blade 576 is held just downstream from the gap such that as the foamed polymer sheet 581 passes through the gap, the sheet is cut by the blade 576. The cut slabs emerges with a profile-cut through the thickness thereof, and at least one of the two cut sheets are taken up by for laminating or roll up/storage. The composite can be sold as a roll or cut in various tile-like sizes, for example 3 ft×3 ft or 2 ft×4 ft.

Lamination can be performed using conventional techniques, including, but not limited to, heated rolls, pinch rolls, and the like. The lamination can utilize existing rolls of the continuous process or be carried out on a dedicated processing line. In one aspect, moisture barrier layer is the surface facing the flooring e.g., the bottom, the barrier layer serving as a vapor barrier. Having the composite installed with the barrier layer facing up, e.g., against the flooring system, the back-side (or underside) of the flooring is best protected from having air moisture and floor wetness settle between the connections (e.g., tongue and grove) of floors planks. In addition, this configuration provides a smoother surface and most importantly, a surface that will not easily puncture from protruding subfloor materials—such as nails, concrete stones, etc. By reducing and or restriction air moisture and floor wetness from entering between the floor boards 'floor cupping' is reduced (where the edges of a board are higher than its center).

In one aspect, the barrier layer laminate does not extend beyond any edge of the foam sheet. In another aspect, the barrier layer laminate extends beyond one or both of the longitudinal edges of the foamed polymer sheet for coupling sheets together during a flooring process.

The at least partially cross-linked and foamed sheet can be laminated with a film or layer comprising one or more moisture barrier layers (e.g. the barrier layer can be a laminate) to provide a composite. The moisture barrier layer can be any one or more of thermoplastic films, a thermoplastic elastomer films, or adhesive layers such as a pressure sensitive or peel-and-stick adhesives. In one aspect, the moisture barrier layer is a multi-film laminate that is configured to assist in the lamination of the thermoplastic foamed sheet with the moisture barrier layer. Thus, in one aspect, the moisture barrier layer laminate comprises a first surface comprising a moisture vapor barrier material, and a second surface configured for facilitating adhesion to the foamed polymeric sheet.

Reference is now made to FIG. 3, which depicts a down-stream operation that may be continuous from that of the process shown in FIG. 2 or carried out separately, where the down stream operation includes the additional steps of a cutting process 504 of foamed polymer sheet 581 and/or a lamination process 506. Thus, moisture barrier layer 515 is pulled from roll 513 to mate with surface 581' of sheet 581 via nip roll 511. Laminate moisture barrier layer 515 can be heated via heater 520 prior to mating with sheet 581. Nip roll 511 can be heated to a predetermined temperature suitable for melt bonding of laminate moisture barrier layer 515 to sheet 581, or for activating an adhesive applied to the surface of moisture barrier layer 515. Alternatively or in addition, a flame heater 520 can be configured to activate surface 515' of moisture barrier layer 515 prior to mating with surface 581' of sheet 582. Composite sheet 582, e.g., with laminate moisture barrier layer 515 on at least one side of sheet, can then be taken up for storage.

Composite sheet 582 provides a moisture/liquid/vapor permeation barrier for the underlayer sheet, e.g., to protect the flooring/sub-flooring. Composite sheet 582 can be provide separately with, or comprise, an adhesive (e.g., pressure sensitive adhesive, peel-off tape) or melt adhesive, or a water-based acrylic adhesive, to bond an adjacent composite sheets 582 together during flooring installation. Composite sheet 582 can comprise an adhesive, e.g., a pressures sensitive adhesive or peel-and-stick adhesive, on the foam side and/or on the moisture barrier layer side of the composite to assist in the flooring installation. Alternatively, the moisture layer extending beyond the edge of the foamed polymeric sheet can be used for overlapping of the adjacent sections of underlayment and such extensions can include adhesive, e.g., a peel-and-stick type adhesive configuration. Composite sheet 582 can include flame retardant material, antimicrobial material, and/or fungicide and/or anti-slip agents.

In one aspect, the cut foamed polymer sheet 581 having a cut-side 581' is laminated on at least one side with a moisture barrier layer 513 having a co-extruded laminate film on at least one side 515 to join with cut-side 581' for providing laminate sheet 582. An exemplary laminate barrier layer 513 is selected from low density polyethylene-ethylene vinyl acetate coextruded films, or cellulose-LDPE films, or PET-polyolefin films, or polyvinyl-polyolefin films and the like. In one aspect, the barrier layer is of a thickness of about 3 mil (76 micron) to about 10 mil (254 micron), in other aspects, a thickness of about 4 mil (102 micron) to about 8 mil (203 micron) can be used, and in yet other aspects, a thickness of about 5 mil (127 micron) to about 6 mil (152 micron) can be used, where the ratio of the thickness of the co-extruded films of the co-extruded barrier layer laminate is about 6:1, 5:1, 4:1, 3:1, or 2:1. In one aspect, the ratio of the thickness of the co-extruded films of the co-extruded barrier layer laminate is 4:1. Thus, for example, a co-extruded barrier layer can be employed consisting of a coextruded sheet composed of a polyolefin layer, e.g., such as a low density polyethylene of 4.2 mil (120 micron) thickness and 1.2 mil (30 micron) of co-extruded layer, e.g., for improving the adhesion of the barrier laminate film to the foamed polymer sheet, consisting of a polyolefin-vinyl acetate material, for example.

Figure 4:
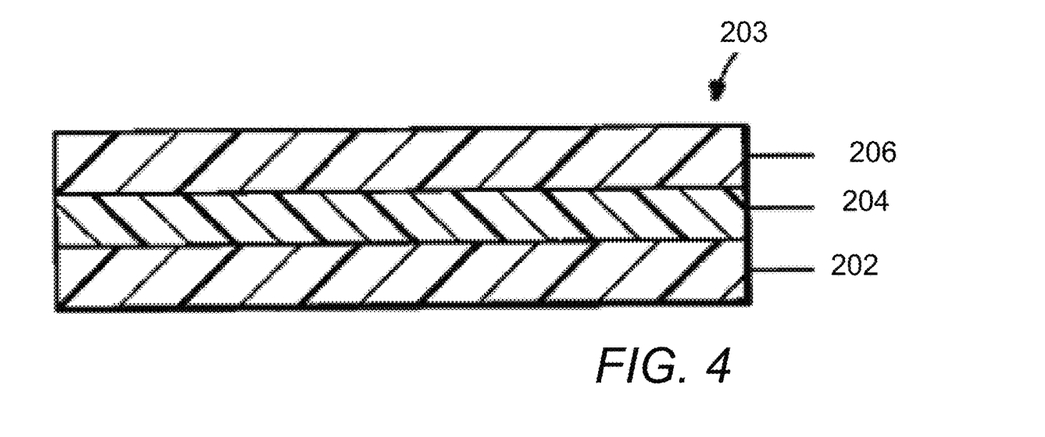
FIG. 4 is a section view of a composite in accordance with the broadest aspect of the present disclosure.

In one aspect, the composition can be installed in a free floating manner on a concrete or wood subflooring, with the barrier layer of the foam sheet contacting the surface of the subflooring. The laminate composition can be provided in long strips, so when it is installed one edge of one strip abuts an adjacent strip. With reference to FIG. 4, the application of the composite 203 is shown with barrier layer 202, co-extruded layer 204 and at least partially crosslinked, foamed polymeric sheet 206.

Figure 5:
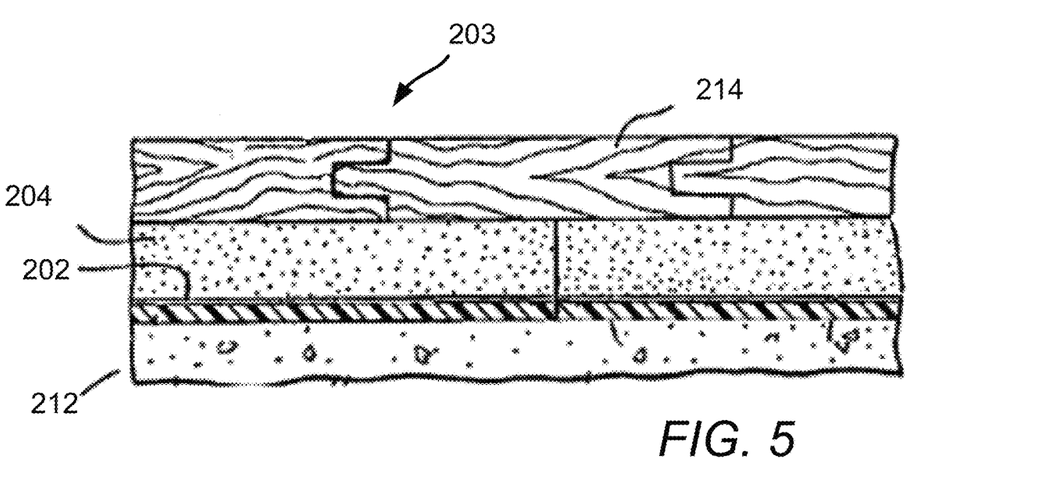
FIG. 5 is a section view of a composite and a flooring in accordance with the broadest aspect of the present disclosure.

With reference to FIG. 5, in one aspect, in particular, for a concrete- or ceramic-subfloor 212, the adjacent strips of laminated foamed polymeric sheet 200 are sealed with tape or other adhesive (not shown) where adjacent strips are abutted together to provide a continuous non-interrupting barrier layer between the subfloor and the flooring material 214, shown as wood flooring. In another example, in particular, for a non-concrete or not ceramic subfloor, the adjacent strips are left abutted together without the use of sealant or tape to provide at least some level of "breathing" between the subfloor and the flooring.

The present disclosure of product and method is generally applicable for use in any floor system such as an apartment, house, or commercial building. A floor system contains a subflooring and a finished flooring. A wood floor system has wood or steel joists supporting both the subflooring and the finish flooring. The subflooring can be for example half-inch (12.7 mm) to one-inch (25.4 mm) thick softwood or hardwood boards or plywood panels and is typically used in residential homes or apartments. The finish flooring is typically thinner and often is hardwood boards. The floor system in steel-framed buildings is typically supported by open-web steel bar joists or steel beams. The floor deck or subflooring on the bar joists or beams can be, for example, a steel deck, a precast concrete slab or panels, or a precast hollow-core concrete slab or panels. The floor system can be a reinforced-concrete floor system typically used in multi-floor buildings. The floor system in a reinforced structure is commonly constructed in a monolithic manner with the structural framing system. The reinforced-concrete subflooring can be flat-slab construction, flat-plate construction, or slab-band construction.

EXAMPLE

Figure 6:
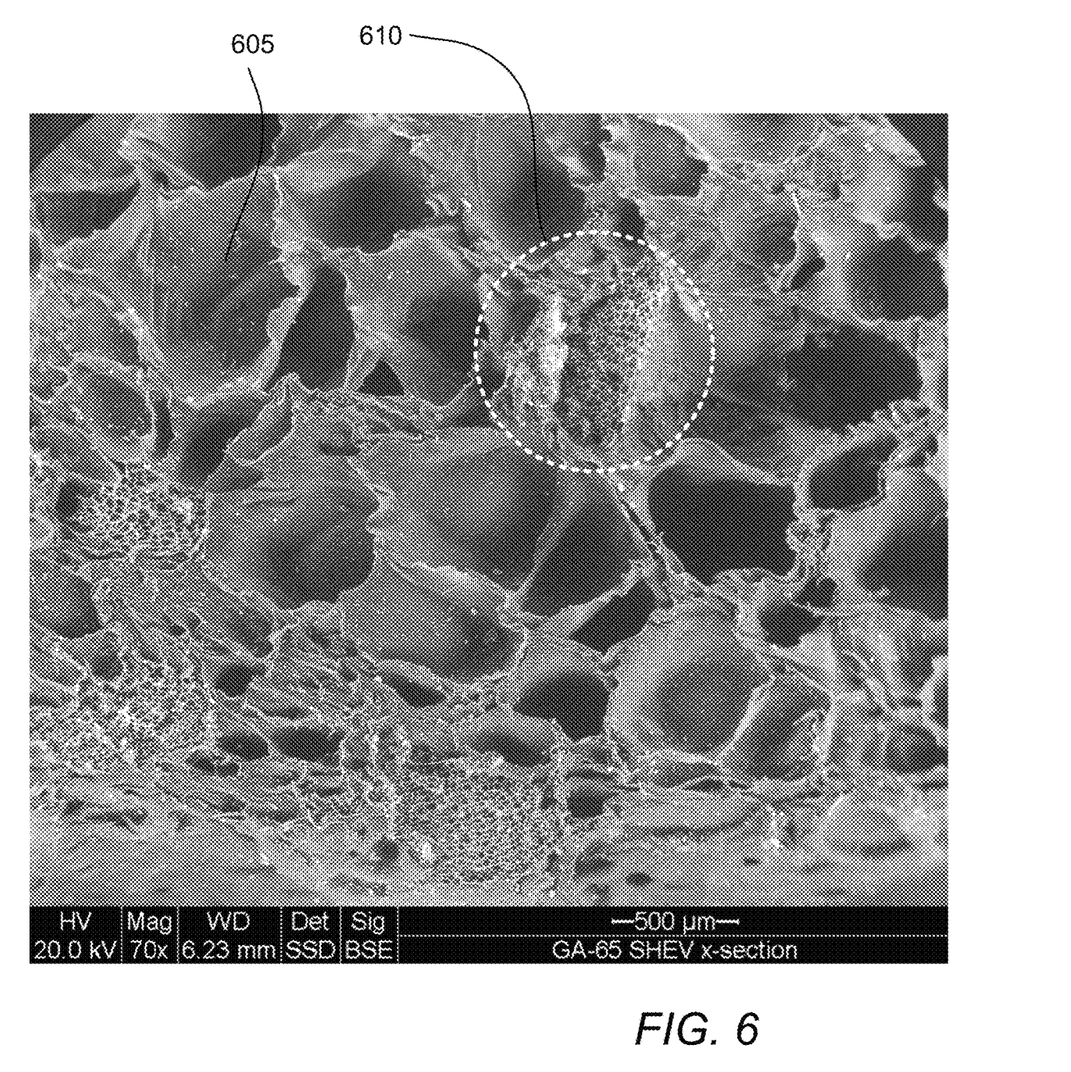
FIG. 6 is a cross sectional view of a foamed polymeric sheet with polymer foam cell 605 and cork particle 610.

A 3.6 mm cork-containing composite sample product was prepared using the above method, comprising a linear low density polyethylene (LLDPE) foamed polymer sheet and a co-extruded laminate barrier layer of LLDPE and ethylene vinyl acetate. The sample provide an average Water Vapor Transmission Rate of 0.493 (2.8% CV) and a permeance of 8.62 (2.8% CV) ng/Pa/s/m$^2$ when tested under NALFA UL 01-2008 Sec. 3.5. Similar thickness (3.6 mm) samples tested under ASTM E96/E96M-10 Proc. B yielded an average Water Vapor Transmission Rate of 0.302 (1.7% CV) and a permeance of 2.49 (1.7% CV) ng/Pa/s/m$^2$. Thus, the presently disclosed product is useful as a vapor barrier underlayment for flooring and would be classified as a Class 1 Vapor Retarder. FIG. 6 is a cross sectional view of the foamed polymeric sheet with polymer foam cell 605 and cork particle 610.

A conventional underlayment typically consists of an impermeable film that is installed on a below grade concrete subfloor with a permeable to semi-impermeable vapor barrier grading (without or without a vapor sheet) installed on top of the impermeable film, the two films being maintained loosely together. This arrangement provides for moisture between the two films, and as a result, moisture will eventually penetrate the permeable to semi-impermeable barrier over time. Indeed, most conventional underlayments are Class 2 or Class 3 Vapor Retarders. In contrast, the present composite with an attached moisture vapor barrier to the foam, qualifies as a Class 1 Vapor Retarder and eliminates or reduces the risk of moisture build-up compared to conventional underlayment techniques by eliminating any gap between the layers of the underlayment.

Although the present disclosure has been described in conjunction with specific embodiments thereof, it is evident that many alternatives, modifications and variations will be apparent to those skilled in the art. The present disclosure will now be described with reference to the following non-limiting example.

Furthermore, while certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures, but may also encompass combinations of elements of the various illustrated embodiments and aspects thereof.

We claim:

1. A composite consisting of:
   a foamed low density polyethylene sheet comprising cork particles, having a first surface and a second surface; and
   a moisture barrier layer of 10 to about 500 microns in thickness adjacent at least one of the first and the second surfaces,
   wherein the moisture barrier layer is a single film layer comprising a cellulose polyolefin vinyl acetate film,
   wherein the cork particles are of an average particle size of 500 microns to 1000 microns and the foamed low density polyethylene sheet comprises an average foam cell diameter between 600 microns to 1500 microns.

2. The composite of claim 1, wherein the foamed low density polyethylene sheet is at least partially cross-linked.

3. The composite of claim 1, wherein the foamed low density polyethylene sheet comprises foam cells having a first average foam cell diameter distribution and a second average foam cell diameter distribution less than the first average foam cell diameter distribution.

4. The composite of claim 3, wherein a ratio of the first average foam cell diameter distribution to the second average foam cell diameter distribution is at least 6:1.

5. The composite of claim 3, wherein a ratio of the first average foam cell diameter distribution to the second average foam cell diameter distribution is at least 10:1.

6. The composite of claim 3, wherein the first average foam cell diameter distribution is between 300 microns to 3500 microns and the second average foam cell diameter distribution is between 1 micron to 50 microns.

7. The composite of claim 1 3, wherein the foamed low density polyethylene sheet comprises the cork particles in an amount of between 1 PHR to 50 PHR.

8. A composite comprising:
   at least partially cross-linked low density polyethylene foamed sheet comprising cork particles in an amount of between 1 PHR to 50 PHR; and
   a moisture barrier layer of 10 microns to about 500 microns in thickness adhered to at least one side of the at least partially cross-linked low density polyethylene foamed sheet,
   wherein the moisture vapor barrier layer is a single film layer comprising a cellulose-polyolefin vinyl acetate film,
   wherein the cork particles are of an average particle size of 500 microns to 1000 microns and the foamed polymeric sheet comprises an average foam cell diameter between 600 microns to 1500 microns.

9. The composite of claim 8, wherein the moisture barrier layer is co-extruded.

10. The composite of claim 8, wherein at least a portion of the moisture barrier layer extends beyond at least one edge of the at least partially cross-linked low density polyethylene foamed sheet.

11. The composite of claim 10, wherein the at least a portion of moisture barrier layer extending beyond at least one edge of the at least partially cross-linked low density polyethylene foamed sheet comprises an adhesive.

* * * * *

UNITED STATES PATENT AND TRADEMARK OFFICE
CERTIFICATE OF CORRECTION

Page 1 of 1

PATENT NO. : 11,913,238 B2
APPLICATION NO. : 17/135944
DATED : February 27, 2024
INVENTOR(S) : Sam Saladino, Zeev Tzur and Baruch Zur It is certified that error appears in the above-identified patent and that said Letters Patent is hereby corrected as shown below:

In the Claims

In Column 16, Claim 7, please change Line 1 to:
7. The composite of claim 1, wherein the foamed low Signed and Sealed this
Twenty-fourth Day of December, 2024

Derrick Brent
*Acting Director of the United States Patent and Trademark Office*